United States Patent [19]

Sherbondy

[11] 4,253,858

[45] Mar. 3, 1981

[54] AIR DIFFUSER

[76] Inventor: Frank Y. Sherbondy, P.O. Box 1106, New Braunfels, Tex. 78130

[21] Appl. No.: 95,415

[22] Filed: Nov. 19, 1979

[51] Int. Cl.$^3$ ............................................. B01D 51/00
[52] U.S. Cl. ............................... 55/419; 55/DIG. 28; 123/566; 138/44
[58] Field of Search ................................. 55/418–419, 55/DIG. 28; 123/119 CG; 138/44

[56] References Cited

U.S. PATENT DOCUMENTS

| 1,874,587 | 8/1932 | Niven | 55/DIG. 28 X |
| 2,607,437 | 8/1952 | Crawford et al. | 55/418 X |
| 2,825,203 | 4/1958 | Bertin et al. | 138/44 X |
| 3,738,088 | 6/1973 | Colosimo | 55/418 X |
| 3,796,025 | 3/1974 | Kasten | 55/419 X |

Primary Examiner—Kathleen J. Prunner
Attorney, Agent, or Firm—Donald A. Kaul

[57] ABSTRACT

An air diffuser is insertable within the intake opening of a carburetor air filter housing in order to separate and diffuse the air flow to the carburetor. The air diffuser includes a body portion insertable in the intake opening and a multiplicity of conduits or pipes having an inner end disposed within the body portion and an outer end extending into the airstream in advance of the housing. The inner end portions of the conduits are disposed in parallel relation while the outer end portions thereof extend angularly outward from the axis of parallelism.

5 Claims, 5 Drawing Figures

AIR DIFFUSER

This invention relates to a device for separating and diffusing the air flow through a carburetor air filter housing and into the carburetor, where the air is mixed with fuel to form a combustible mixture for operating the internal combustion engine of which the carburetor forms a part or is attached. The device of the present invention is referred to herein as an air diffuser.

In the past, it has been been recognized that beneficial effects arise by interrupting, diffusing, misdirecting or otherwise altering the air flow through a carburetor air filter housing, in order to cause such flow to have a somewhat turbulent nature. In the usual carburetor air filter arrangement, where no air diffuser or other air diverting means is provided, the air enters through the air intake opening in the air filter housing, travels straight back as a mass to contact against the filter, then eventually passes down through the filter to enter the carburetor. The prior art has recognized that by dividing or diverting or diffusing the air flow, it travels around the filter better, and by not hitting the filter in one straight flow mass, the air passes more uniformly through the filter and to the carburetor. The result is an arrangement where the air passing to the carburetor is somewhat cleaner and more regular which, in turn, causes the engine to run somewhat more smoothly.

In prior U.S. Pat. No. 3,584,439 and in prior U.S. Pat. No. 3,616,618, issued respectively to Gronholz and Gronholz et al., a series of vanes are provided in the carburetor air filter inlet opening and are disposed at an angle in order to cause the incoming air to swirl or flow spirally. In U.S. Pat. No. 3,354,621 to Wilson, a series of angularly disposed overlapping swirl plates are provided in the air filter inlet opening to cause the air to follow a spiral flow path. While the arrangements shown in these prior patents may be effective insofar as their effect on the airstream is concerned, they nevertheless require that the air filter housing itself be specially built or specially modified to include internal vanes or plates.

In contrast to these prior art arrangements, the present invention relates to a device which is adaptable to existing forms of air filter housing. As a result, although the air diffuser of the present invention may have to be provided in a few different standard sizes, the device itself can nevertheless be readiy attached to an existing air filter housing without any modifications to the air filter housing itself.

It is an object of the present invention to provide a new and improved form of air diffuser device adaptable for attachment to conventional carburetor air filter housings and which will diffuse the airstream without requiring any modification to the housing itself.

Another object of the present invention is to provide a relatively inexpensive yet effective air diffuser which can be quickly and easily installed into and removed from a conventional carburetor air filter housing, without the need for any special tools or assembly techniques.

Another object of the present invention is to provide a compact, effective, yet inexpensive, device for attachment to existing forms of carburetor air filter housings to diffuse the air flow being introduced into such housings for ultimate passage to the carburetor.

Other objects, advantages and salient features of the present invention will become apparent from the following detailed description, which, taken in conjunction with the annexed drawings, discloses a preferred embodiment thereof.

The foregoing objects are attained by providing an air diffuser unit which includes a body portion adapted to fit into the intake opening of the air filter housing and a projecting means extending into the airstream in advance of the air filter housing. The body portion includes a tubular member configured to fit snugly within the intake opening of the air filter housing so that no air can flow between the tubular member and the housing. A multiplicity of separate, yet assembled, conduits or pipes are provided. Each of the pipes has an axially elongated portion and a forward portion offset from the axis of elongation by an acute angle. The axially elongated portions of the multiplicity of conduits fit within the tubular member and hence extend at least partially into the intake opening of the air filter housing. The angularly offset or forward portions project beyond the tubular member and provide the means which projects into the airstream in advance of the air filter housing. As a result, when the air diffuser is inserted into the inlet opening of the air filter housing, the air attempting to enter that housing must pass through the conduits. Such air first enters through the angularly offset portions of the tubular members, then passes through the parallel portions and finally enters into the air filter housing itself.

Referring now to the drawings, which form a part of this original disclosure:

Figure 1:
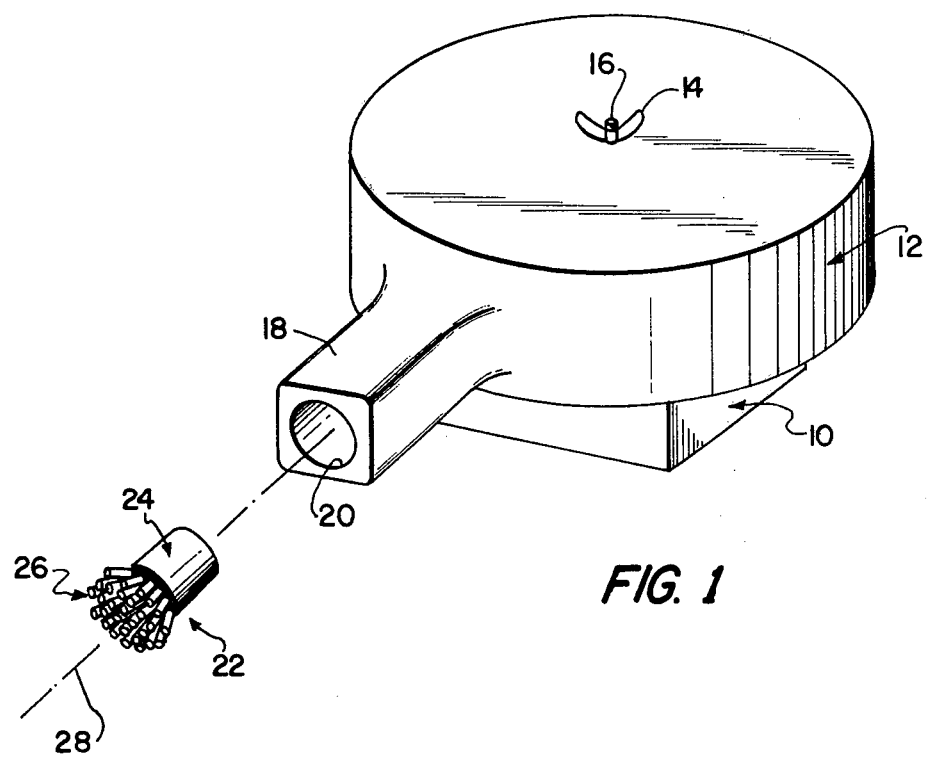
FIG. 1 is a perspective view of a carburetor and its attendant air filter housing, and of the air diffuser device of the present invention.

Referring now to the drawings in further detail, there is illustrated in FIG. 1 a carburetor generally designated 10 of the type which is ordinarily attached to and forms a part of conventional internal combustion engines. Attached above the carburetor is an air filter housing generally designated 12 which is attached to the carburetor by a suitable wing nut 14 which attaches to an upstanding threaded shaft 16 projecting upwardly from the carburetor. The air filter housing 12 includes an air inlet in the form of a forwardly projecting neck or spout 18 having an air inlet opening 20 formed therein. The arrangement thus far described is a conventional arrangement, commonly found on automobile engines as well as other types of internal combustion engines.

Figure 2:
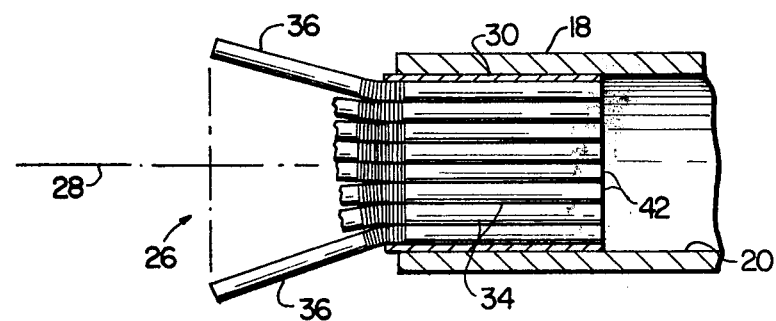
FIG. 2 is a fragmentary sectional view through the air diffuser and a portion of the air filter housing.
Figure 3:
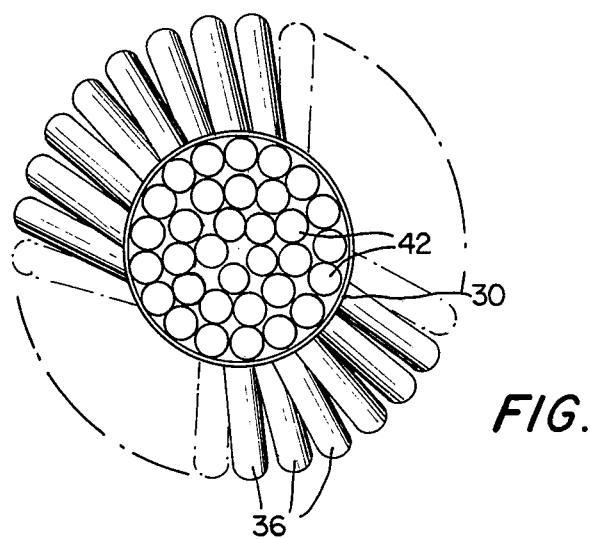
FIG. 3 is a rear elevational view of the diffuser of the present invention.
Figure 4:
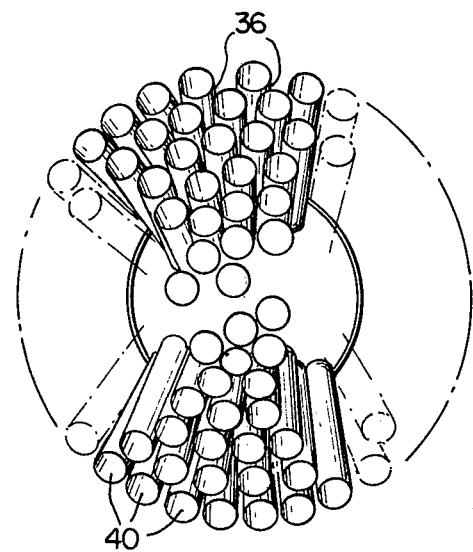
FIG. 4 is a front elevational view of the air diffuser of the present invention.

The air diffuser of the present invention is generally designated 22, and, as illustrated in FIGS. 1 and 2, is adapted to fit into the inlet opening 20 of the air filter housing intake 18. The diffuser includes both a body portion generally designated 24 adapted to fit at least partially into the opening 20, and a projecting means generally designated 26 which projects into the airstream in advance of the air filter housing 12 to divide the airstream into a multiplicity of separate streams which pass through the diffuser 22 and into the housing. The axis 28 illustrated in FIG. 1, constitutes not only the central axis of the inlet neck or spout 18 and opening 20, but, in addition, constitutes the axis of normal air flow into the air filter opening.

The body portion 24 includes a tubular member or sleeve 30 of a size and configuration which permits the same to be inserted in a substantially airtight manner in the intake opening 20. That is, as illustrated in FIG. 2, the sleeve is insertable within the opening, is frictionally retained therein, and forms a substantially airtight connection so that air is prevented from passing around the outside of the sleeve 30 and the walls which define the inlet opening 20.

Figure 5:
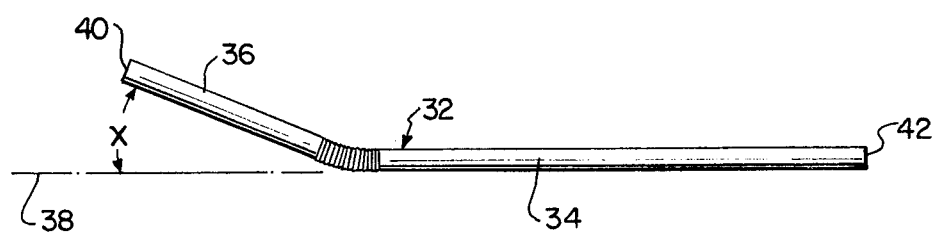
FIG. 5 is a side elevational view of a single one of the conduits utilized in the air diffuser of the present invention.

The air diffuser 22 includes a multiplicity of separate conduits or pipes, an individual one of which is illustrated in FIG. 5. Each pipe or conduit is generally designated 32 and includes an axially elongated portion 34 and an angularly offset portion 36. The axially elongated portion 34 is elongated along an axis designated 38 in FIG. 5. The offset portion 36 is offset from this angle of elongation by an acute angle designated x in FIG. 5. Each pipe or conduit 32 has an inlet opening 40 at the forward end of the offset portion 36 and a discharge opening 42 at the end of the elongated portion 34.

The conduits 32 are arranged in a fashion where they substantially completely fill the sleeve 30. The elongated portions 34 form the inner end portions of the conduits and these portions are disposed within the sleeve 30 in completely parallel arrangement. The angularly disposed or outer end portions 36 serve to form the projecting means 26 of the air diffuser.

When the air diffuser is inserted within the air filter housing, the inner end portions 34 are actually parallel to the central axis 28 while all of the angled portions 36 are disposed at an angle with respect to that central axis. Ideally, the individual conduits or pipes are formed of a right cylindrical configuration and the ends, which form the forward and rearward edges thereof, are arranged perpendicular to the right cylindrical axis internally of each conduit. Both the individual conduits 32 and the sleeve 30 can be formed of any suitable material. While the material can be a metallic material, it can also advantageously be formed of plastic which may be less expensive.

In use, the consumer simply purchases a diffuser 22 of a type and style adapted to fit the particular air filter inlet housing opening for his particular automobile or other engine upon which the diffuser is to be installed. After purchase, the consumer simply inserts the sleeve portion manually into the opening 20 until the diffuser is engaged therein. Because all air flow is flowing into the neck or spout 18, rather than outwardly therefrom, there is no tendency for the diffuser to become separated. To the contrary, the constant inward air pressure tends to maintain the diffuser in position, regardless of the jars or bumps to which the entire unit may be subjected.

The incoming air flowing generally in a direction along the axis 28 first meets the projecting forward angular portions 36. The airstream is thus divided by all of these conduits into a multiplicity of separate streams, each of which flows through a conduit to discharge through the exit opening 42 and to pass into the air filter inlet housing. Obviously, the arrangement of the conduits provides a series of interstices between various adjacent conduits. Nevertheless, the interstices themselves serve the same function as the conduits, namely, to divide the airstream into a multiplicity of separate streams. Thus, if the entire airstream is considered, the major portion thereof will pass through the conduits while a minor portion thereof will pass between the conduits. The result, however, is that the entire airstream is separated into a multiplicity of separate streams for the beneficial effects previously described.

Various changes and modifications apparent to those skilled in the art may be made without departing from the spirit and scope of the invention as defined in the appended claims.

What is claimed is:

1. An air diffuser insertable within the intake opening of a carburetor air filter housing, said diffuser comprising:
   means projecting into the airstream in advance of said air filter housing to divide said airstream into a multiplicity of separate streams which pass through said diffuser to enter said housing;
   a body portion disposed rearwardly of said projecting means, said body portion being insertable within said intake opening to mount said diffuser upon said housing;
   said body portion fitting within said intake opening in a substantially airtight manner to prevent air from passing around the outside of said body portion and into said housing; and
   a multiplicity of conduits, each having an inner end portion disposed within said body portion and having an outer end portion projecting forwardly of said body portion, said conduit outer end portions forming said means projecting into the airstream;
   said inner end portions being disposed parallel to each other and to a central axis of said diffuser;
   said outer end portions being angled outwardly with respect to said inner end portions.

2. An air diffuser as defined in claim 1 wherein said outer end portions are displaced outwardly from said central axis by an acute angle.

3. An air diffuser as defined in claim 2 wherein said conduits are tubular pipes.

4. An air diffuser as defined in claim 3 wherein said tubular pipes are right cylindrical pipes.

5. An air diffuser as defined in claim 4 wherein said outer end portions terminate in an edge which is perpendicular to the right cylindrical axis of the pipes.

* * * * *